A. E. WILLIAMS.
COMBINED MOTOR TRACTOR AND CULTIVATOR.
APPLICATION FILED DEC. 1, 1916.
1,308,691.
Patented July 1, 1919.
2 SHEETS—SHEET 1.
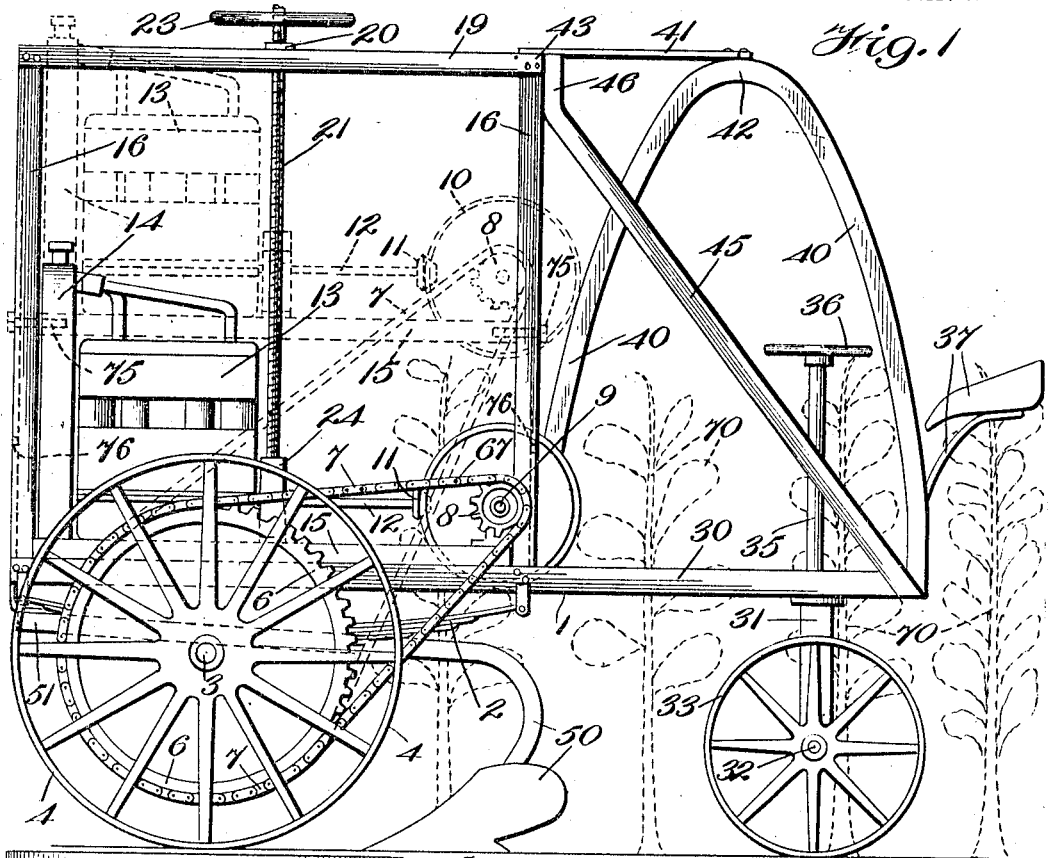
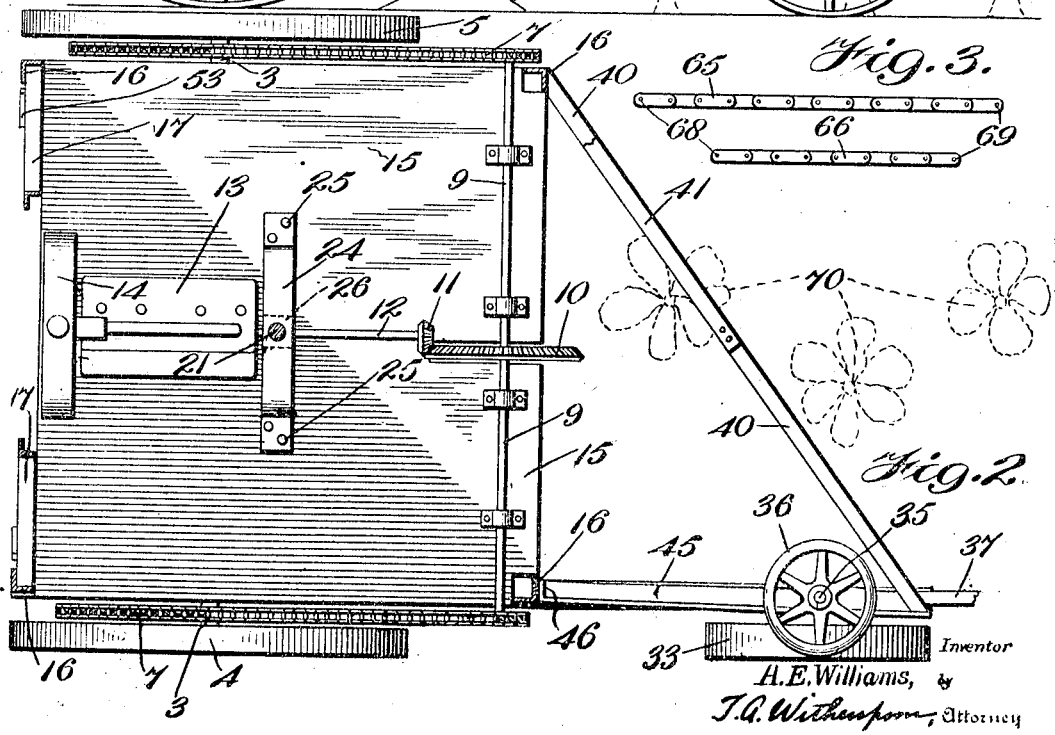
Inventor
A. E. Williams,
by
T. G. Witherspoon, Attorney A. E. WILLIAMS.
COMBINED MOTOR TRACTOR AND CULTIVATOR.
APPLICATION FILED DEC. 1, 1916.
1,308,691.
Patented July 1, 1919.
2 SHEETS—SHEET 2.
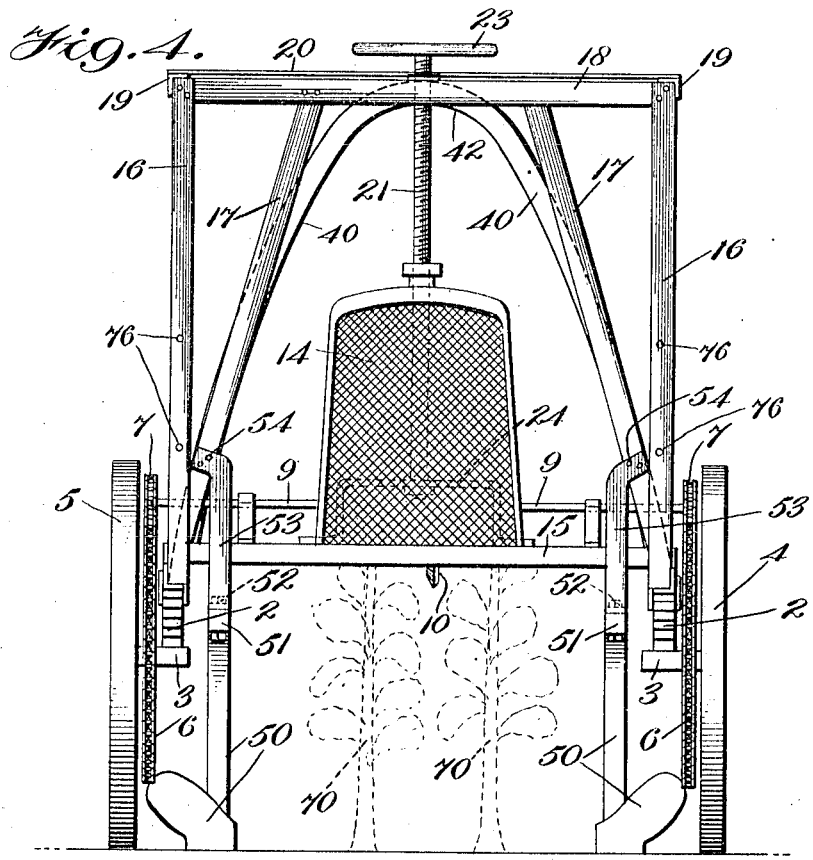
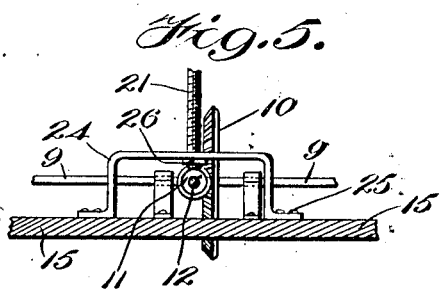
Inventor
A. E. Williams, by
T. A. Witherspoon.
Attorney

UNITED STATES PATENT OFFICE.

ALEXANDER E. WILLIAMS, OF THE UNITED STATES ARMY.

COMBINED MOTOR TRACTOR AND CULTIVATOR.

1,308,691.  Specification of Letters Patent.  Patented July 1, 1919.

Application filed December 1, 1916. Serial No. 134,408.

*To all whom it may concern:*

Be it known that I, ALEXANDER E. WILLIAMS, a captain in the United States Army, and a citizen of the United States, temporarily residing at Washington, in the District of Columbia, have invented certain new and useful Improvements in Combined Motor-Tractors and Cultivators; and I do hereby declare the following to be a full, clear, and exact description of the invention, such as will enable others skilled in the art to which it appertains to make and use the same.

This invention relates to motor tractors, especially adapted for general plowing and for the cultivation of crops at different periods during their growth, and has for its object to provide an apparatus of this kind which will be simple in construction, comparatively inexpensive to manufacture, and which will be more certain in operation than those which have been heretofore proposed.

With these and other objects in view the invention consists in the novel details of construction and combinations of parts, more fully hereinafter disclosed and particularly pointed out in the claim.

Referring to the accompanying drawings forming a part of this specification in which like numerals designate like parts in all the views—

Figure 1 is a diagrammatic elevational view of a motor tractor made in accordance with this invention;

Fig. 2 is a partially sectional plan view of the parts shown in Fig. 1;

Fig. 3 is a view illustrating different lengths of chain which are adapted to be inserted in the drive chain when the motor is elevated from its lowest position;

Fig. 4 is a front elevational view of the parts shown in Fig. 1; and

Fig. 5 is a detail view illustrating the main engine shaft, the means for elevating the motor and the beveled connection between the main engine shaft and the main drive wheels of the tractor.

1 indicates any suitable framework supported as upon the springs 2 resting on the axle members 3, carrying the main drive wheels 4 and 5, with which the driving sprockets 6 are rigidly connected, and 7 indicates the main drive sprocket chains passing around the said sprockets 6 and the pinions 8 mounted on the cross drive shaft 9 rigidly connected with the main beveled driving gear 10, all as will be clear from the drawings.

Meshing with the bevel gear 10 is the driving bevel 11 rigid with the main engine shaft 12, rotated by any suitable engine or motor such for example as 13. It is preferred to employ a motor of the gasolene explosive type and 14 represents the radiator therefor.

The engine 13 and its associated parts are conveniently mounted upon any suitable support or platform such as 15 which is guided in the vertical braces 16 of any suitable framework, conveniently made in a rectangular form, and which may also be provided with the diagonally disposed braces 17 at the front thereof, with the cross braces 18 at the top thereof, as well as the top braces 19 at the sides thereof.

Across the top side members 19 at or about midway between the front and rear vertical braces 16 is the cross brace 20 adapted to accommodate the elevating screw 21 provided with the hand wheel or other means of turning the same 23, and which screw enters the bracket or strap 24 secured to the said platform 15 as by fastenings 25 as illustrated.

The lower end of said screw 21 is conveniently provided with a nut or other member 26, which enables the said screw to lift the bracket or strap 24 and with it the platform 15, all as will be clear from the drawings. To the rear of the vertically disposed braces 16 extends the bottom or main beam 30 of the motor tractor, and secured to the underside of the said beam is the vertically disposed member 31 carrying the axle 32 and rear or steering wheel 33 in a manner well understood.

Also passing through said beam 30 and connected with the said steering wheel 33 by well known means, not shown, is the steering post 35 provided with the hand wheel 36, and in rear of said post 35 is suitably secured to said beam 30 the driver's seat 37. Extending diagonally across from the rear end of the beam 30 to the opposite vertically disposed frame member 16 is the arch or curved bracing member 40, provided with a strut or top brace 41 secured to the arch 42 at one end thereof, and at its other end to the framework of the tractor as at 43.

Also extending from the rear end of the beam 30 upwardly and in the same plane therewith is the diagonally disposed bracing member 45, which at its upper end 46 is conveniently secured to the upper end of the rear side frame member 16 as shown.

A plurality of plows may be secured to the framework of the motor tractor disclosed, in any suitable manner, and I have illustrated by way of example a pair of cultivator plows 50, the beams 51 of which are secured as at 52 to a pair of members 53 disposed parallel to each other and spaced apart the distance of two contiguous rows of growing plants. Said members 53 are secured as at 54 to the diagonally disposed members 17 the main body portions of which pass down forward of the platform 15 as illustrated.

As stated above, one of the objects of this invention is to enable a farmer to cultivate growing crops at different stages of their growth, and in order to prevent the platform and its associated parts from bearing down said crops and thus injuring or destroying the same after they have reached a certain height, I provide for the lifting of the said platform 15, the motor 13 and its associated parts as indicated above. When said platform however is lifted the cross driving shaft 9 and sprockets 8 are likewise lifted, so that the sprocket drive chains 7 are required to be of different lengths according to the height to which the said platform 15 may be lifted. In order to afford a ready means for thus lengthening the said chains 7, to accommodate different heights of crops to be cultivated there is provided different lengths of chain such as 65 and 66, see Fig. 3, which may be readily inserted in the sprocket chains 7 to lengthen the same by merely removing link pins such as 67 in said chains 7 and thereupon inserting a convenient length of chain such as 66 and securing it at its ends such as 68 and 69 to the opened out ends of the chain 7 after the links 67 have been removed. Of course should a longer length of chain be required, owing to the platform 15 having been lifted a greater height, then a length such as 65 may be inserted in the manner just described.

The parts may be so designed that when the platform 15 is in its highest position, such as is illustrated in dotted lines in Fig. 1 it will pass over crops 70, which are sufficiently far advanced to not need a further cultivation before maturity. But of course the parts may be otherwise designed so as to accommodate different heights of platform.

The curved arch 42 in all cases is elevated sufficiently above the beam 30 as to enable the crops in all cases to easily pass thereunder.

The operation of this machine will be readily understood from the foregoing, but may be briefly summarized as follows:

When no plows are attached to the framework, the tractor may be used about the farm for any suitable purpose, and when the crops are not to be cultivated it may be used for general plowing, in all such cases the platform 15 being conveniently located at its lowest position as illustrated in full lines in Figs. 1 and 4. On the other hand when the tractor is to be used for cultivating purposes then a pair of plows such as 50 are attached thereto as illustrated, and if the crops 70 are in their first stages of growth, the platform 15 will pass readily thereover and need not be elevated at all. As the crops 70 get higher, however, the platform 15 and its associated parts will be readily raised by operating the screw wheel 23 or other means not shown, after having inserted a length of chain such as 66 in the main drive chains 7. When the platform 15 is thus elevated to a height sufficient to pass over the particular crops being cultivated then the tractor is guided by the operator through the wheel 36 and steering shaft 35, so as to cause the wheels 33, 4 and 5 to occupy a position between the rows of crops 70, and the plowing is thus accomplished. As the crops get higher other lengths of chain such as 65 may be inserted in the drive chains 7 and the platform 15 may be raised to its highest position as is illustrated by the dotted lines in Fig. 1, whereupon the crops may be again cultivated without injury thereto.

After the platform 15 and motor have been raised to any desired position it may be securely held therein by inserting the pins 75 through the holes 76 with which the frame members 16 are provided and cause said pins to enter corresponding holes in said platform 15, all as will be clear from Figs. 1 and 4.

It is obvious that those skilled in the art may vary the details of construction as well as the arrangement of parts without departing from the spirit of the invention, and therefore, I do not wish to be limited to the above disclosure except as may be required by the claim.

What is claimed is:—

In a farm tractor the combination of a framework; parallel disposed means for attaching a pair of plows to said framework; a motor; means carried by said framework for supporting said motor; means carried by said motor supporting means for transmitting power to the wheels of the tractor; and means for elevating and lowering different distances said motor, said power transmitting means and said motor supporting means relative to said plow attaching means, substantially as described.

In testimony whereof I affix my signature.

ALEXANDER E. WILLIAMS.